United States Patent [19]

Hirai et al.

[11] Patent Number: 5,213,895

[45] Date of Patent: May 25, 1993

[54] PARTICLE-BEARING COMPOSITE AND A METHOD FOR PRODUCING THE SAME

[75] Inventors: Hidefumi Hirai; Hironobu Hashimoto, both of Choufu, Japan

[73] Assignee: Daiso Co., Ltd., Osaka, Japan

[21] Appl. No.: 757,595

[22] Filed: Sep. 11, 1991

[30] Foreign Application Priority Data

Sep. 11, 1990 [JP]   Japan .................................. 2-239035

[51] Int. Cl.$^5$ ................................................. B32B 5/16
[52] U.S. Cl. ..................................... 428/403; 427/221;
428/407; 502/159; 526/908
[58] Field of Search ................ 428/403, 407; 502/159;
427/221; 526/908

[56] References Cited

U.S. PATENT DOCUMENTS

| | | | |
|---|---|---|---|
| 3,887,491 | 6/1975 | Ramirez et al. | 502/159 |
| 3,997,472 | 12/1976 | O'Driscoll et al. | 502/159 |
| 4,081,576 | 3/1978 | Hensel et al. | 427/385 |
| 4,252,671 | 2/1981 | Smith | 502/159 |
| 4,252,672 | 2/1981 | Smith | 502/159 |
| 4,252,673 | 2/1981 | Smith | 502/159 |
| 4,252,674 | 2/1981 | Smith | 502/159 |
| 4,252,675 | 2/1981 | Smith | 502/159 |
| 4,252,676 | 2/1981 | Smith | 502/159 |
| 4,252,677 | 2/1981 | Smith | 502/159 |
| 4,252,678 | 2/1981 | Smith | 502/159 |
| 4,551,441 | 11/1985 | Van Dijk et al. | 502/159 |
| 4,696,911 | 9/1987 | Boerma et al. | 502/159 |
| 4,728,465 | 3/1988 | De Jongh et al. | 502/159 |
| 4,888,248 | 12/1989 | Hirai et al. | 428/403 |
| 5,062,991 | 11/1991 | Siimon et al. | 428/403 |

FOREIGN PATENT DOCUMENTS 0023102  1/1981  European Pat. Off. .

OTHER PUBLICATIONS

Journal of Colloid and Interface Science, vol. 131, No. 1, pp. 186–191 (1989).
"Hyomen (Surface)", vol. 24, No. 8, pp. 413–419 (1986).

*Primary Examiner*—Paul J. Thibodeau
*Assistant Examiner*—D. S. Nakarani
*Attorney, Agent, or Firm*—Birch, Stewart, Kolasch & Birch

[57] ABSTRACT

Disclosed is a particle-bearing composite comprising a solid carrier and polymer-protected particles adsorbed thereon, wherein the polymer has a number average molecular weight of 3,000 to 300,000 and the particles are of a metal and/or a metal compound. The particle-bearing composite of the present invention is produced by a method in which a polymer-protected colloidal dispersion, which is comprised of a dispersion medium, colloidal metallic particles and/or metal compound particles dispersed in the dispersion medium and a protective polymer having a number average molecular weight of 3,000 to 300,000 and serving as a protective colloid for protecting the colloidal particles, is contacted with a solid carrier. The particle-bearing composite of the present invention can exhibit excellent catalytic performances with high reproducibility when used as an active component-bearing type catalyst, and can also be advantageously used in the fields of electric and magnetic materials because the metallic particles and/or metal compound particles uniformly borne by the solid carrier in the particle-bearing composite of the present invention can exert excellent electric and magnetic performances.

20 Claims, No Drawings

PARTICLE-BEARING COMPOSITE AND A METHOD FOR PRODUCING THE SAME

BACKGROUND OF THE INVENTION

Field Of The Invention

The present invention relates to a particle-bearing composite and a method for producing the same. More particularly, the present invention is concerned with a particle-bearing composite comprising a solid carrier and polymer-protected particles adsorbed thereon, wherein the polymer has a number average molecular weight in a specific range and the particles are of a metal and/or a metal compound. The article-bearing composite of the present invention is produced by a method in which a polymer-protected colloidal dispersion, which is comprised of a dispersion medium, colloidal metal and/or metal compound particles dispersed in the dispersion medium and a protective polymer having a specific number average molecular weight and serving as a protective colloid for protecting the colloidal particles, is contacted with a solid carrier.

The particle-bearing composite of the present invention has a morphology such that the particles, which have a narrow particle size distribution and are uniformly, stably dispersed in the above-mentioned polymer-protected colloidal dispersion, and the particle-protecting polymer, are adsorbed together onto the solid carrier, while maintaining a well-dispersed state thereof. Therefore, the particle-bearing composite of the present invention can exhibit excellent catalytic performances with high reproducibility. In addition, the composite of the present invention can be advantageously used in the fields of electric and magnetic materials because the metallic particles and/or metal compound particles uniformly borne by the solid carrier can exert excellent electric and magnetic performances.

Discussion Of Related Art

With respect to the conventional method for producing a solid carrier bearing metallic particles and/or metal compound particles thereon, a method is known in which a solid carrier, such as activated carbon, silica gel, activated alumina, diatomaceous earth, silicon carbide and zirconium silicate, is impregnated with a solution of a metal salt to adsorb the metal salt on the solid carrier and then, treated with a suitable treating agent, such as a reducing agent, an oxidizing agent, a sulfide-forming agent or a hydroxide-forming agent, to thereby deposit particles of metal and/or metal compound on the solid carrier. In this method, however, it is difficult to control not only the interaction between the solid carrier and the metal salt but also the complicated interactions involved in the reactions for the formation of particles of metal and/or metal compound, causing disadvantages that the reproducibility of not only the distribution morphology of the metallic particles and/or metal compound particles on the solid carrier but also the particle size distribution and particle fineness of the particles are likely to be poor and that metal ions in the non-reduced state are likely to remain in the interior of the solid carrier. Therefore, for example, when this type of the particle-bearing material is used as a catalyst, a satisfactory catalytic activity cannot be obtained.

In recent years, it was attempted to protect a colloidal metal or metal compound dispersion with a polymer functioning as a protective colloid, thereby providing a stable colloidal dispersion in which metal and/or metal compound fine particles having a small particle size and a narrow particle size distribution are uniformly dispersed. This type of colloidal dispersion can be obtained with high reproducibility and the obtained dispersion is very stable, so that even when the dispersion is stored for a prolonged period of time, there is no danger for the particles in the colloidal dispersion to be aggregated and precipitated and, therefore, it is advantageously easy to handle such a colloidal dispersion.

For example, H. Hirai et al. disclosed that when a colloidal metal dispersion is protected by a protective colloid comprised of a polymer (having a functional group capable of chemically binding with an amino group through the formation of a covalent bond), such as a hydrazide polymer, an acrylic ester polymer or acrylic amide polymer, the resultant polymer-protected colloidal metal dispersion is very stable and that when this polymer-protected colloidal metal dispersion is contacted with an amino group-containing solid carrier, a stable colloidal metal complex, in which the functional group of the protective polymer forms a covalent bond in cooperation with the amino group of the solid carrier to establish a chemical binding between the solid carrier and the protective polymer adsorbed onto the individual particles, can be obtained and such a complex can be advantageously used in various fields, including the field of solid catalysts (see, for example, U.S. Pat. No. 4,888,248). However, in this prior art, it is necessary for both of the protective polymer and solid carrier to have functional groups for forming a covalent bond. This requirement causes some problems from the viewpoint of production processes and economics.

Therefore, if it becomes possible to adsorb polymer-protected metallic particles and/or metal compound particles onto a solid carrier (not via chemical binding by means of a covalent bond) by contacting a colloidal dispersion having the polymer-protected particles dispersed therein with the solid carrier, the above-mentioned drawbacks and problems inevitably accompanying the prior art method would be obviated.

Y. Nakao provided a colloidal metal dispersion having a polymer (which functions as a protective colloid) added thereto ("Hyomen (Surface)", Vol. 24, pp. 413-419, 1986). In this colloidal metal dispersion, the polymer is strongly adsorbed onto the metal particles to render hydrophilic the surfaces of the particles, so that the colloidal metal dispersion is stabilized. On the other hand, however, the polymer adsorbed onto the metal particles prevents the metal particles from being adsorbed onto surfaces of other materials, such as the surface of a solid carrier. As a result, it is difficult to adsorb and immobilize the colloidal metal particles protected by the polymer (as a protective colloid) onto the solid carrier. The experiments carried out by the present inventors have confirmed this difficulty (see Comparative Examples 1 and 2 described later).

For this reason, when it is intended to produce a metal particle-bearing substance by adsorbing colloidal metallic particles, it is necessary to choose types of metallic particles which can be used for forming a colloidal metal dispersion without the use of a protective polymer. Therefore, the types of metallic particles are necessarily limited, particularly, to metallic platinum and gold particles prepared using a specific reducing agent. However, in the colloidal metal dispersion of such specific metal particles, not only is the size of the metallic particles likely to be large as compared to those in the polymer-protected colloidal metal dispersions having a protective polymer (which functions as a protective colloid) added thereto, but also the dispersion of colloidal particles is unstable, so that the metallic particles are likely to be aggregated and precipitated, leading to a difficulty in preparing a particle-bearing substance on which fine particles are uniformly adsorbed and immobilized.

SUMMARY OF THE INVENTION

In the difficult situation as mentioned above, the present inventors have made extensive and intensive studies with a view toward developing a method for effectively and stably adsorbing and immobilizing colloidal particles of metal and/or metal compound onto a solid carrier by the use of a stable polymer-protected colloidal metal and/or metal compound dispersion having an organic protective polymer added thereto. As a result, it has unexpectedly been found that the desired effective adsorption of colloidal particles can be attained by the use of an organic protective polymer having a number average molecular weight in the range of from 3,000 to 300,000. It has also been found that when the amount of the polymer is chosen so that the polymer is present in an amount of from 0.01 to 30 in terms of a molar ratio of monomer units constituting the polymer to metal atoms of the particles adsorbed on the solid carrier, the colloidal particles can be more effectively adsorbed onto the solid carrier. It has further been found that a particle-bearing composite obtained by the above method has a morphology such that the fine particles (which have been substantially individually and separately protected by the polymer as the protective polymer and uniformly, stably dispersed with a narrow particle size distribution in the colloidal dispersion) are adsorbed together with the protective polymer onto the solid carrier, while maintaining the excellent dispersion state, so that the resultant particle-bearing composite can exert excellent performances. The present invention has been completed, based on these novel findings.

Accordingly, in one aspect of the present invention, there is provided a particle-bearing composite comprising:

a solid carrier, particles of at least one member selected from the group consisting of a metal and a metal compound, the particles being adsorbed on the carrier, and, an organic protective polymer having a number average molecular weight of from 3,000 to 300,000, the particles having the protective polymer adsorbed thereon and being substantially individually and wherein at least one of the solid carrier and the protective polymer has no functional group capable of serving to form a covalent bond and perform a chemical binding between the solid carrier and the protective polymer.

Examples of metallic particles include particles of palladium, rhodium, ruthenium, platinum, iridium, osmium, silver, gold and copper.

Colloidal metal dispersions to be used for producing metal the particle-bearing composites of the present invention can be obtained by, for example, subjecting a solution of a metal salt, such as palladium(II) chloride, rhodium(III) chloride, ruthenium(III) chloride, chloroplatinic acid, chloroiridium acid salt, osmium(VII) oxide, silver nitrate, chloroauric acid and copper(II) sulfate, to a treatment with a reducing agent.

Examples of reducing agents include an alcohol, molecular hydrogen, white phosphorus, hydrazine, sodium tetrahydroborate, sodium citrate, tannic acid, formaldehyde, sodium hydrogensulfite. Instead of the reduction by means of the above agents, the reduction of metal salts to metal particles can be performed by actinic ray radiation or ultrasonic wave radiation.

With respect to the reduction of metal salts using a reducing agent, an explanation is given below. For example, when an alcohol is used as a reducing agent, a metal salt and a protective polymer are dissolved together in an alcohol and the resultant solution is heated to thereby obtain a polymer-protected colloidal metal dispersion in which the produced metallic particles are substantially individually and separately protected by the protective polymer. In this connection, it is noted that especially when methanol is used as the reducing alcohol, it is preferred to add a base, such as sodium hydroxide.

Examples of metal compound particles include particles of metal borides, metal sulfides, metal hydroxides and metal oxides. Metal species are not specifically limited. Examples of metal species for metal compounds include iron, nickel, cobalt, cadmium, copper, barium, aluminum and the like.

With respect to the production of polymer-protected colloidal dispersion in which metal compound particles are substantially individually and separately protected by a protective polymer and uniformly, stably dispersed, an explanation is given below.

A colloidal metal compound dispersion can be obtained by a conventional method in which a solution of a metal salt or a metal alkoxide corresponding to the desired metal species is treated with, for example, a boride-forming agent, a sulfide-forming agent or a hydroxide-forming agent. For example, a colloidal dispersion of particles of a metal boride, such as nickel boride, cobalt boride or iron boride, can be obtained by treating a solution of a metal salt corresponding to the desired metal species with a boride-forming agent, such as sodium tetrahydroborate or potassium tetrahydroborate. A colloidal dispersion of particles of a metal sulfide, such as copper sulfide, cobalt sulfide, nickel sulfide or cadmium sulfide, can be obtained by treating a solution of a metal salt corresponding to the desired metal species with a sulfide-forming agent, such as sodium thiosulfate, sodium sulfide, ammonium sulfide or hydrogen sulfide. A colloidal dispersion of particles of a metal hydroxide, such as iron hydroxide or aluminum hydroxide, can be obtained by subjecting a solution of a metal salt corresponding to the desired metal species to a treatment for hydrolysis. A colloidal dispersion of particles of a metal oxide, such as magnetite or ferrite, can be obtained by adding sodium hydroxide to a solution of a metal salt corresponding to the desired metal species to render alkaline the solution and heat-aging the resultant alkaline solution. A colloidal dispersion of particles of, e.g., barium titanate, can be obtained by dissolving barium alkoxide and titanium alkoxide in an alcohol and adding water to the resultant solution.

In the particle-bearing composite of the present invention, it is preferred that the metal particles and/or metal compound particles are adsorbed on the solid carrier in an amount of at least $1 \times 10^{-7}$ mol, generally in an amount of from $1 \times 10^{-7}$ to $8,000 \times 10^{-7}$ mol per gram of the solid carrier. The amount of the particles carried by the solid carrier can be measured by ultraviolet-visible absorption spectrometry, atomic absorption spectrometry, chemical analysis or the like.

The types of organic polymers as protective polymers are not specifically limited as long as the polymers have a colloid-protecting action. Preferred examples of organic polymers include poly(N-vinyl-2-pyrrolidone), poly(vinyl alcohol), a copolymer of N-vinyl-2-pyrrolidone with acrylamide or methyl acrylate, poly(methyl vinyl ether), gelatin, sodium casein, gum arabic and the like.

In the present invention, it is requisite that the organic polymer as a protective polymer for the metallic particles and/or metal compound particles have a number average molecular weight of from 3,000 to 300,000. A preferred range of the number average molecular weight is from 10,000 to 160,000. When the organic polymer has a number average molecular weight of greater than 300,000, as is seen from Comparative Examples 1 and 2, it is impossible to provide a particle-bearing composite having metallic particles and/or metal compound particles adsorbed thereon in an amount of at least $1 \times 10^{-7}$ mol per gram of a solid carrier, which amount is required for the composite to exert the desired performances. The number average molecular weight can be measured by gel permeation chromatography through a calibration curve prepared using a standard polystyrene.

In the particle-bearing composite of the present invention, it is preferred that the organic polymer be present in an amount of from 0.01 to 30, more preferably from 0.05 to 20, most preferably from 0.25 to 8 in terms of a molar ratio of monomer units constituting the polymer to metal atoms of the metal and/or metal compound particles.

The solid carrier is preferably porous, although a non-porous solid carrier can also be used. In the porous carrier, it is preferred that the average pore diameter be from 5 Å to 0.1 μm. Examples of solid carriers include those of natural and synthetic materials. Specific examples of solid carriers include those which are of inorganic materials, such as activated carbon, silica gel, alumina, silica-alumina, silicon carbide and zirconium silicate; organic materials, such as polystyrene and polystyrene derivatives. Solid carriers of diatomaceous earth and pumice and the like can also be used. The shape and size of the solid carrier are not specifically limited. Powdery, granular, cubic or rectangular forms of solid carriers can be used. Fibrous and fabric forms of solid carriers can also be formed. In general, solid carriers having a size of from about 1 μm to about 10 mm are used. In the case of activated carbons, granular, powdery and fibrous forms of activated carbons are preferably used.

As described above, in the particle-bearing composite of the present invention, it is an essential feature that fine metallic particles and/or metallic compound particles (which have been substantially individually and separately protected by an organic polymer having a number average molecular weight of from 3,000 to 300,000 and uniformly, stably dispersed with a narrow particle distribution in the colloidal dispersion) are adsorbed together with the protective polymer onto the solid carrier, while maintaining the excellent dispersion state, wherein at least one of the solid carrier and the protective polymer has no functional group capable of serving to form a covalent bond and perform a chemical binding between the solid carrier and the protective polymer.

With respect to the particle size and particle size distribution of the metallic particles and/or metal compound particles, there is no particular limitation.

In general, however, with respect to the metallic particles, the average particle size is preferably from about 10 Å to about 0.3 μm. Especially for the use of the particle-bearing composite as a catalyst, a preferred metal particle size range is preferably from about 10 Å to about 150 Å. When the composite is used as an magnetic or electric material, a preferred metal particle size range varies depending on the shape of metal particles, namely, spherical shape or elongated shape. In the case of the use as magnetic materials, a preferred metal particle size range is from about 50 Å to 500 Å in diameter for spherical shape particles, and from about 80 Å to about 200 Å in width and from about 300 Å to 0.2 μm in length for elongated shape particles. In the case of the use as electric materials, a preferred metal particle size range is from about 20 Å to 0.1 μm in diameter for spherial shape particles, and from about 50 Å to 200 Å in width and from about 200 Å to 0.2 μm in length for elongated shape particles.

With respect to metal compound particles, a preferred average particle size range is from about 40 Å to about 2.0 μm. Especially when the composite is used as a catalyst, a preferred average metal compound particle size is from about 40 Å to about 300 Å. In the case of the use as magnetic or electric materials, a preferred average metal compound particle size also varies depending on the shape of the metal compound particles, namely, spherical shape or elongated shape. In the case of the use as magnetic materials, a preferred metal compound particle size range is from about 50 Å to about 0.7 μm in diameter for spherical shape particles, and from about 80 Å to 300 Å in width and from about 300 Å to 0.9 μm in length for elongated shape particles. In the case of the use as electric materials, a preferred metal compound particle size range is from about 50 Å to about 0.5 μm in diameter for spherical shape particles, and from about 100 Å to 500 Å in width and from about 300 Å to about 0.5 μm in length for elongated shape particles.

The particle size distribution can be represented by a coefficient of variation which is defined by formula $$\frac{\sigma}{\bar{x}}$$

wherein $\bar{x}$ is an average particle size and $\sigma$ is a standard deviation. In the particle-bearing composite of the present invention, it is preferred that the metallic particles and metal compound particles have a coefficient of variation of not greater than 60 % for the average particle size of less than 200 Å, not greater than 40 % for the average particle size of from 200 Å to less than 0.1 μm and not greater than 20 % for the average particle size of from 0.1 μm to less than 0.5 μm. With respect to the particles having an average particle size of 0.5 μm or more, the coefficient of variation is generally considerably less than 20 %.

In the particle-bearing composite of the present invention, as described above, the metallic particles and/or metal compound particles have an organic protective polymer adsorbed thereon and are substantially individually and separately protected by the protective polymer. This morphology as mentioned above is attributed to the protective action of the organic polymer as the protective colloid. In this connection it is noted, it is possible that several particles, which are substantially individually protected by the protective polymer, occasionally gather together. However, the majority of the particles are individually and separately protected by the protective polymer adsorbed on the individual particles.

In another aspect of the present invention, there is provided a method for producing a particle-bearing composite, which comprises:
(1) providing a polymer-protected colloidal dispersion comprising:
   (a) a dispersion medium,
   (b) colloidal particles of at least one member selected from the group consisting of a metal and a metal compound, the colloidal particles being dispersed in the dispersion medium, and
   (c) an organic protective polymer having a number average molecular weight of from 3,000 to 300,000, the colloidal particles having the protective polymer adsorbed thereon and being substantially individually and separately protected by the protective polymer serving as a protective colloid;
(2) contacting the polymer-protected colloidal dispersion with a solid carrier, wherein at least one of the solid carrier and the protective polymer has no functional group capable of serving to form a covalent bond and perform a chemical binding between the solid carrier and the protective polymer, to thereby form a particle-bearing composite comprising the solid carrier and, adsorbed thereon, the particles protected by the protective polymer; and
(3) isolating the composite from the dispersion medium.

The dispersion medium to be employed in the present invention is not particularly limited as long as it is capable of dissolving an organic, protective polymer and a metal salt or a metal alkoxide which is used to prepare particles of at least one member selected from the group consisting of a metal and a metal compound. However, it is generally preferred that water, a straight chain or branched alcohol having 1 to 10 carbon atoms, a water miscible ether, such as dioxane, or a mixture thereof be used as the dispersion medium. Among these, water, methanol, ethanol and mixtures thereof are most preferred. The amount of the dispersion medium is not particularly limited. However, it is generally used in an amount of from 1,000 to 500,000, preferably from 5,000 to 100,000 in terms of a molar ratio of the dispersion medium to the metal atoms of the particles.

The adsorption of the above-mentioned particles individually and separately protected by the organic protective polymer onto the solid carrier may be performed for example, by adding the colloidal dispersion of particles of at least one member selected from the group consisting of a metal and a metal compound which are individually and separately protected by the protective polymer serving as a protective colloid to the solid carrier, and shaking (when the solid carrier is activated carbon or the like, shaking is particularly preferred from the viewpoint of avoiding destruction of the solid carrier) or stirring the resultant mixture at a temperature of from 0° C. to 100° C., preferably room temperature (25° C.), for a period of from 0.5 to 100 hours, preferably from 1 to 72 hours. The isolation of the composite comprising the solid carrier and, adsorbed thereon, the particles protected by the protective polymer is performed for example, by separating the composite from the dispersion medium, washing the separated composite with a solvent, such as water or an alcohol, and drying the washed composite at 10° to 80° C., preferably at 20° to 30° C. under vacuum. The drying is preferably conducted in a nitrogen atmosphere.

The organic protective polymer to be incorporated in the polymer-protected colloidal dispersion may be added to a solution of a metal salt or a metal alkoxide to be converted to the desired metal or metal compound at the time of the formation of colloidal particles of at least one member selected from the group consisting of a metal and a metal compound. Alternatively, the polymer may be added to the dispersion of colloidal particles of at least one member selected from the group consisting of a metal and a metal compound just after the formation of the colloidal particles.

In the method of the present invention, the organic polymer is preferably used in an amount of from 0.01 to 30 in terms of a molar ratio of monomer units constituting the polymer to metal atoms of the metallic particles and/or metal compound particles.

The amount of metal particles and/or metal compound particles in the particle-bearing composite of the present invention can generally be determined by ultraviolet-visible absorption spectrometry. That is, after the contact of the solid carrier with the polymer-protected colloidal dispersion, the amount of the particles remaining unadsorbed in the colloidal dispersion is measured, and after the washing of the obtained composite, the amount of the particles washed out into the washings is measured. Then the total of both the above amounts is subtracted from the amount of particles in the original colloidal dispersion to thereby obtain the amount of adsorbed particles. As described above, in the particle-bearing composite of the present invention, fine metallic particles and/or metallic compound particles (which have been substantially individually and separately protected by an organic polymer having a number average molecular weight of from 3,000 to 300,000 and uniformly, stably dispersed with a narrow particle distribution in the colloidal dispersion) are adsorbed together with the protective polymer onto the solid carrier, while maintaining the excellent dispersion state. Therefore, when the particle-bearing composite of the present invention is used as an active component-bearing type catalyst, excellent catalytic activity can be exerted with high reproducibility. In addition, the particle-bearing composite of the present invention can be advantageously used in various other fields, such as applications in which the excellent electric or magnetic performances of the composite are functionally utilized.

Detailed Description Of The Preferred Embodiments

The present invention will now be described in more detail with reference to the following Examples, Comparative Examples and Application Examples, which should not be construed as limiting the scope of the present invention.

In the following Examples, in the case where metallic particles are borne by a carrier, the amount of metallic particles is measured by the following method. Colloidal dispersions of certain metallic particles having different metallic particle concentrations are prepared and the dispersions are individually subjected to ultraviolet-visible absorption spectrometry. As a result, it is found that there is a good linear relationship between the metallic particle concentration of the dispersion and the difference between the absorbances at 500 nm and 700 nm. Least squares method is applied to the above relationship to thereby prepare a calibration curve. A predetermined amount of a metallic particle dispersion having a predetermined metallic particle concentration is contacted with a predetermined amount of a carrier to adsorb the metallic particles onto the carrier. The resultant metallic particle-bearing composite is separated from the dispersion. The composite is washed with a solvent and the obtained washings are collected. The above dispersion from which the composite has been separated is combined with the collected washings, to obtain a sample for measurement. When the carrier used is, for example, activated carbon, the sample for measurement is centrifuged at 10,000 rpm for 12 hours to precipitate any activated carbon particles which have been suspended in the sample. On the other hand, when the carrier used is, for example, a silica gel, any suspended silica gel is not observed and, therefore, a centrifugation step is omitted. The sample for measurement, which has been centrifuged or not been centrifuged, is subjected to ultraviolet-visible absorption spectrometry. From the obtained value, the amount of the metallic particles present in the above sample for measurement is determined, based on the calibration curve. The amount determined is subtracted from the amount of the metallic particles in the original colloidal dispersion, thereby determining the amount of the metallic particles borne by the carrier.

EXAMPLE 1

5.9 mg (0.033 mmol) of palladium(II) chloride ($PdCL_2$, manufactured and sold by Kojima Chemical Co., Ltd., Japan) and 30 mg (0.27 mmol as monomer units; molar ratio to the palladium atoms: 8) of poly(N-vinyl-2-pyrrolidone)(manufactured and sold by Tokyo Kasei Kogyo Co., Ltd., Japan; number average molecular weight: 10,000) are dissolved in 25 ml of methanol and 25 ml of distilled water, respectively. The thus obtained two solutions are mixed with each other to thereby obtain a yellow solution. This solution is heated under reflux for 4 hours in a 100 ml flask provided with a reflux condenser, thereby preparing a blackish brown, uniform colloidal dispersion of metallic palladium particles. An aliquot of the palladium particle dispersion is dried on a carbon film to prepare a test solid sample, and the test solid sample is observed through a transmission type electron microscope. As a result, it is found that the dispersion of the metallic palladium particles is good and that the average particle diameter of the palladium particles is 19 Å, wherein the coefficient of variation is 45%. The palladium particle dispersion is stable and exhibits no change in the dispersion state even after storage for more than 2 months at room temperature.

5 ml of the above-obtained palladium particle dispersion is added to 1 g of activated carbon (BAC G-70R, average particle diameter: 0.7 mm, manufactured and sold by Kureha Chemical Industry Co., Ltd., Japan) and the resultant mixture is subjected to shaking for 24 hours, thereby adsorbing the palladium particles onto the activated carbon. The resultant composite of palladium particle-activated carbon (palladium particle-activated carbon composite) is washed 5 times with distilled water.

The amount of the palladium particles in the particle-bearing composite is measured by the measuring method as described above. As a result, it is found that the above palladium particle-activated carbon composite bears palladium particles in an amount of $13.9 \times 10^{-7}$ mol per gram of the activated carbon.

The above composite which has been washed with distilled water is further washed 2 times with methanol and then, dried at 30° C. under vacuum.

0.15 g (palladium atom content: $2 \times 10^{-7}$ g) of the palladium particle-activated carbon composite is placed in a 50 ml-eggplant type flask and the air in the flask is replaced with hydrogen. 19.5 ml of distilled methanol is then added thereto and stirred at 30° C. for about 30 minutes under atmospheric pressure, thereby saturating the hydrogen. When 0.5 ml of a methanol solution containing 0.5 mmol acrylonitrile is dropwise added thereto, the hydrogen begins to be absorbed, thereby forming propionitrile. In this instance, the initial rate of hydrogenation is found to be 1.8 mol/sec per gram atom of palladium. This rate is 64 times the rate attained by the use of a conventional palladium catalyst comprised of palladium carried by activated carbon, the conventional catalyst having been obtained by the conventional impregnation method as described in Comparative Example 3 given later.

APPLICATION EXAMPLE 1

Using as a catalyst the palladium particle-activated carbon composite obtained in Example 1, acrylamide is hydrogenated in substantially the same manner as described in Example 1 to obtain propionamide. The initial rate of hydrogenation is 0.97 mol/sec per gram atom of palladium and this rate is 51 times the rate attained by the use of a conventional palladium catalyst comprised of palladium carried by activated carbon, the conventional catalyst having been obtained by the conventional impregnation method as described in Comparative Example 3 given later.

APPLICATION EXAMPLE 2

Using as a catalyst the palladium particle-activated carbon composite obtained in Example 1, cyclohexene is hydrogenated in substantially the same manner as described in Example 1 to obtain cyclohexane. The initial rate of hydrogenation is 0.48 mol/sec per gram atom of palladium and this rate is 53 times the rate attained by the use of a conventional palladium catalyst comprised of palladium carried by activated carbon, the conventional palladium catalyst having been obtained by the conventional impregnation method as described in Comparative Example 3 given later.

APPLICATION EXAMPLE 3

Using as a catalyst the palladium particle-activated carbon composite obtained in Example 1, 1,3-cyclooctadiene is hydrogenated in substantially the same manner as described in Example 1 to obtain cyclooctene and cyclooctane. The initial rate of hydrogenation is 1.14 mol/sec per gram atom of palladium and this rate is 34 times the rate attained by the use of a conventional palladium catalyst comprised of palladium carried by activated carbon, the conventional palladium catalyst having been obtained by the conventional impregnation method as described in Comparative Example 3 given later.

The reaction is terminated at the time when an equimolar amount of hydrogen has been absorbed into the charged 1,3-cyclooctadiene and then, the reaction product obtained is analyzed. As a result, it is found that the product is comprised of 98.8 % of cyclooctene, 0.6 % of cyclooctane and 0.6 % of 1,3-cyclooctadiene. In the case of the hydrogenation of 1,3-cyclooctadiene using a conventional palladium catalyst obtained by the conventional impregnation method, the obtained product is comprised of 85.3 % of cyclooctene, 7.5 % of cyclooctane and 7.2 % of 1,3-cyclooctadiene. Thus, it is found that the palladium particle-activated carbon composite of the present invention is a catalyst which is excellent in the selectivity for cyclooctene which is a commercially important intermediate.

EXAMPLE 2

5.9 mg (0.033 mmol) of palladium(II) chloride ($PdCL_2$, manufactured and sold by Kojima Chemical Co., Ltd., Japan) and 0.91 mg (0.0082 mmol as monomer units; molar ratio to the palladium atoms: 0.25) of poly(N-vinyl-2-pyrrolidone) (manufactured and sold by Tokyo Kasei Co., Ltd., Japan; number average molecular weight: 10,000) are dissolved in 25 ml of methanol and 20 ml of methanol, respectively. The thus obtained two solutions are mixed with each other to thereby obtain a yellow solution. This solution is heated under reflux for 30 minutes in a 100 ml-flask provided with a reflux condenser. Then, 5 ml of methanol containing 0.066 g of sodium hydroxide dissolved therein is added thereto, and heated for 10 minutes, thereby obtaining a blackish brown, uniform colloidal dispersion of metallic palladium particles. An aliquot of the palladium particle dispersion is dried on a carbon film to prepare a test solid sample, and the test solid sample is observed through a transmission type electron microscope. As a result, it is found that the dispersion of the metallic palladium particles is good and that the average particle diameter of the palladium particles is 26 Å, wherein the coefficient of variation is 35%. The palladium particle dispersion is stable and exhibits no change in the dispersion state even after storage for more than 2 weeks at room temperature.

5 ml of the above-obtained palladium particle dispersion is added to 0.25 g of activated carbon (BAC G-70R, average particle diameter: 0.7 mm, manufactured and sold by Kureha Chemical Industry Co., Ltd., Japan) and the resultant mixture is subjected to shaking for 24 hours, thereby adsorbing the palladium particles onto the activated carbon. The thus obtained palladium particle-activated carbon composite is washed with distilled water and methanol and then, dried at 30° C. under vacuum in the same manner as in Example 1.

The thus obtained palladium particle-activated carbon composite bears palladium particles in an amount of $102.5 \times 10^{-7}$ mol per gram of the activated carbon.

EXAMPLE 3

5 ml of the palladium particle dispersion obtained in Example 2 is added to 0.05 g of activated carbon Granular Shirasagi: $C_2X4/6-2$, manufactured and sold by Takeda Chemical Industries Ltd., Japan) and the resultant mixture is subjected to shaking for 24 hours, thereby adsorbing the palladium particles onto the activated carbon.

The thus obtained palladium particle-activated carbon composite bears palladium particles in an amount of $417.9 \times 10^{-7}$ mol per gram of the activated carbon.

EXAMPLE 4

5 ml of the palladium particle dispersion obtained in Example 2 is added to 0.05 g of silica gel (Kieselgel 60; 70-230 meshes, manufactured and sold by Merck & Co., Inc., Germany) and the resultant mixture is subjected to shaking for 24 hours, thereby adsorbing the palladium particles onto the silica gel.

The thus obtained palladium particle-silica gel composite bears palladium particles in an amount of $540.1 \times 10^{-7}$ mol per gram of the silica gel.

EXAMPLE 5

5 ml of the palladium particle dispersion obtained in Example 2 is added to 0.05 g of silica gel (CariAct 50; 5-10 meshes, manufactured and sold by Fuji-Davison, Japan) and the resultant mixture is subjected to shaking for 24 hours, thereby adsorbing the palladium particles onto the silica gel.

The thus obtained palladium particle-silica gel composite bears palladium particles in an amount of $138.4 \times 10^{-7}$ mol per gram of the silica gel.

EXAMPLE 6

Substantially the same procedure as in Example 2 is repeated except that 3.75 mg (0.085 mmol as monomer units; molar ratio to the palladium atoms: 2.6) of poly (vinyl alcohol)(manufactured and sold by Sowa Science Co., Japan; number average molecular weight: 16,000) is used instead of poly(N-vinyl-2-pyrrolidone), thereby preparing a blackish brown, uniform colloidal dispersion of metallic palladium particles. An aliquot of the palladium particle dispersion is dried on a carbon film to prepare a test solid sample, and the test solid sample is observed through a transmission type electron microscope. As a result, it is found that the dispersion of the metallic palladium particles is good and that the average particle diameter of the palladium particles is 53 Å, wherein the coefficient of variation is 24 %. The palladium particle dispersion is stable and exhibits no change in the dispersion state even after storage for more than 1 month at room temperature.

5 ml of the above-obtained palladium particle dispersion is added to 0.25 g of activated carbon (BAC G-70R, average particle diameter: 0.7 mm, manufactured and sold by Kureha Chemical Industry Co., Ltd., Japan) and the resultant mixture is subjected to shaking for 24 hours, thereby adsorbing the palladium particles onto the activated carbon.

The thus-obtained palladium particle-activated carbon composite bears palladium particles in an amount of $21.9 \times 10^{-7}$ mol per gram of the activated carbon.

EXAMPLE 7

Substantially the same procedure as in Example 2 is repeated except that 8.7 mg (0.033 mmol) of rhodium (III) chloride ($RhCl_3.3H_2O$, manufactured and sold by Nippon Engelhard Ltd., Japan); and 30 mg (0.27 mmol as monomer units; molar ratio to the rhodium atoms; 8) of poly(N-vinyl-2-pyrrolidone) (manufactured and sold by Tokyo Kasei Kogyo Co., Ltd., Japan; number average molecular weight: 10,000) are employed, thereby preparing a blackish brown, uniform colloidal dispersion of metallic rhodium particles. An aliquot of the rhodium particle dispersion is aired on a carbon film to prepare a test solid sample, and the test solid sample is observed through a transmission type electron microscope. As a result, it is found that the dispersion of the metallic rhodium particles is good and that the average particle diameter of the rhodium particles is 35 Å, wherein the coefficient of variation is 50%. The rhodium particle dispersion is stable and exhibits no change in the dispersion state even after storage for more than 2 months at room temperature.

10 ml of the above-obtained rhodium particle dispersion is added to 1 g of activated carbon (BAC G-70R, average particle diameter: 0.7 mm, manufactured and sold by Kureha Chemical Industry Co., Ltd., Japan) and the resultant mixture is subjected to shaking for 24 hours, thereby adsorbing the rhodium particles onto the activated carbon.

The thus-obtained rhodium particle-activated carbon composite bears rhodium particles in an amount of $55.1 \times 10^{-7}$ mol per gram of the activated carbon.

EXAMPLE 8

The same rhodium particle dispersion as described in Example 7 is used. 5 ml of the rhodium particle dispersion is added to 0.02 g of silica gel (Kieselgel 60, 70–230 meshes, manufactured and sold by Merck & Co., Inc., Germany) and the resultant mixture is subjected to shaking for 24 hours, thereby adsorbing the rhodium particles onto the silica gel.

The amount of the rhodium particle in the particle-bearing composite is measured in the same manner as described in Example 4. As a result, it is found that the above rhodium particle-silica gel composite bears rhodium particles in an amount of $356.9 \times 10^{-7}$ mol per gram of the silica gel.

EXAMPLE 9

Using 13.6 mg (0.033 mmol) of chloroauric acid ($HAuCl_4.4H_2O$, manufactured and sold by Wako Pure Chemical Industries, Ltd.) and 30 mg (0.27 mmol as monomer units; molar ratio to the gold atoms: 8) of poly(N-vinyl-2-pyrrolidone) (manufactured and sold by Tokyo Kasei Kogyo Co., Ltd., Japan; number average molecular weight: 10,000), a metallic gold particle dispersion is prepared in the same manner as described in Example 2, thereby obtaining a purple, uniform colloidal dispersion of metallic gold particles. An aliquot of the gold particle dispersion is dried on a carbon film to prepare a test solid sample, and the test solid sample is observed through a transmission type electron microscope. As a result, it is found that the dispersion of metallic gold particles is good and that the average particle diameter of the gold particles is 260 Å, wherein the coefficient of variation is 40%. The gold particle dispersion is stable and exhibits no change in the dispersion state even after storage for more than 2 weeks at room temperature.

5 ml of the above-obtained gold particle dispersion is added to 0.1 g of silica gel (Kieselgel 60, 70–230 meshes, manufactured and sold by Merck & Co., Inc., Germany) and the resultant mixture is subjected to shaking for 24 hours, thereby adsorbing the gold particles onto the silica gel.

The amount of the gold particles in the particle-bearing composite is measured in the same manner as described above except that a calibration curve is prepared utilizing the absorbance at 520 nm which is measured by taking as a base line a tangential line drawn at the lowest portions of both sides of the characteristic absorption band (460 nm–630 nm) of the colloidal dispersion of metallic gold particles in the ultraviolet-visible absorption spectrum. As a result, it is found that the above gold particle-silica gel composite bears gold particles in an amount of $38.4 \times 10^{-7}$ mol per gram of the silica gel.

EXAMPLE 10

0.274 g (1.0 mmol) of ferric chloride ($FeCl_3.6H_2O$, manufactured and sold by Kanto Chemical Co., Ltd., Japan) is dissolved in 0.5 ml of water. To the resultant solution is added 17.5 ml of hot water, thereby obtaining a colloidal dispersion of ferric hydroxide particles. Then 11.1 mg (0.10 mmol as monomer units; molar ratio to the metallic ferric atoms: 0.1) of poly(N-vinyl-2-pyrrolidone)(manufactured and sold by Tokyo Kasei Kogyo Co., Ltd., Japan; number average molecular weight: 10,000) dissolved in 2 ml of water is added to the above-obtained dispersion of ferric hydroxide particles, thereby obtaining a yellowish brown, uniform colloidal dispersion of ferric hydroxide particles. An aliquot of the ferric hydroxide particle dispersion is dried on a carbon film to prepare a test solid sample, and the test solid sample is observed through a transmission type electron microscope. As a result, it is found that the dispersion of the ferric hydroxide particles is good and that the average particle diameter of the ferric hydroxide particles is 300Å, wherein the coefficient of variation is 25%. The ferric hydroxide particle dispersion is stable and exhibits no change in the dispersion state even after storage for more than a week at room temperature.

3 ml of the above-obtained ferric hydroxide particle dispersion is added to 1 g of silica gel (CariAct 50; 5–10 meshes, manufactured and sold by Fuji-Davison, Japan), and the resultant mixture is subjected to shaking for 24 hours, thereby adsorbing the ferric hydroxide particles onto the silica gel.

The amount of the ferric hydroxide particles in the particle-bearing composite is measured in the same manner as described in Example 1, except that no centrifugation is carried out. That is, using a calibration curve prepared from the difference between the absorbance values measured at 400 nm and 500 nm, it is found that the above ferric hydroxide particle-silica gel composite bears ferric hydroxide particles in an amount of $965.0 \times 10^{-7}$ mol (as iron atoms) per gram of the silica gel.

EXAMPLE 11

1.00 g (3.70 mmol) of ferric chloride ($FeCl_3.6H_2O$, manufactured and sold by Kanto Chemical Co., Ltd., Japan) and 0.51 g (1.84 mmol) of ferrous sulfate ($FeSO_4.7H_2O$, manufactured and sold by Kanto Chemical Co., Ltd., Japan) are dissolved in 50 ml of water to obtain a solution. To the solution is added 6.7 ml of an aqueous solution as prepared by dissolving 1 g of sodium hydroxide in 20 ml of water, and the resultant mixture is heated under reflux for 5 minutes, thereby preparing a colloidal dispersion of magnetite [$Fe_3O_4$, a mixed Fe(II)-Fe(III) oxide] particles. The resultant magnetite particles are washed with water five times by a decantation method, and dialyzed against water for 3 days to thereby remove any unreacted iron ions. In order to measure the concentration of iron in the obtained magnetite particle dispersion, the predetermined aliquot is taken from the magnetite particle dispersion while vigorously stirring. To the sample taken from the magnetite particle dispersion is added a small amount of concentrated hydrochloric acid, thereby decomposing the magnetite particles to convert the dispersion into a solution. 2 ml is taken from the thus obtained aqueous iron solution, and 2 ml of a 10% by weight aqueous hydroxylamine hydrochloride solution is added thereto. The resultant mixture is allowed to stand still at 60° C. for 1 hour.

Quantitative analysis of Fe(III) ion is performed by colorimetric analysis using 1,10-phenanthroline to obtain the iron concentration of the original magnetite particle dispersion. Magnetite concentration of the magnetite particle dispersion is calculated from the thus obtained iron concentration. A dispersion containing 1 g of magnetite particles dispersed per liter of water is prepared by diluting the original magnetite particle dispersion with water. A solution obtained by dissolving 120 mg (1.08 mmol as monomer units; molar ratio to the iron atoms: 4) of poly(N-vinyl-2-pyrrolidone) (manufactured and sold by Tokyo Kasei Kogyo Co., Ltd., Japan; number average molecular weight: 10,000) in 5 ml of water is added to 20 ml of the above-diluted magnetite particle dispersion while dispersing the magnetite particles with ultrasonic waves by means of ultrasonic cleaner (model FU-10C, output: 60 W, manufactured and sold by Imagawa Rikagaku Kikai Co., Ltd.), thereby preparing a blackish brown uniform magnetite particle dispersion. An aliquot of this magnetite particle dispersion is dried on a carbon film to prepare a test solid sample, and the test solid sample is observed through a transmission type electron microscope. As a result, it is found that the dispersion of the metallic magnetite particles is good, and that the average particle diameter of the magnetite particles is 120 Å, with the coefficient of variation being 21%. The magnetite particle dispersion is stable and exhibits no change in the dispersion state even after storage for more than 2 weeks at room temperature.

2.5 ml of the above-obtained magnetite particle dispersion is added to 0.5 g of silica gel (Kieselgel 60, 70–230 meshes, manufactured and sold by Merck & Co., Inc. Germany), and the resultant mixture is subjected to shaking for 24 hours, thereby adsorbing the magnetite particles onto the silica gel.

The amount of the magnetite particles in the particle-bearing composite is measured in the same manner as described in Example 1, except that no centrifugation is carried out. That is, using a calibration curve prepared from the difference between the absorbance values measured at 500 nm and 700 nm, it is found that the above magnetite particle-silica gel composite bears magnetite particles in an amount of $282.0 \times 10^{-7}$ mol (as iron atoms) per gram of the silica gel.

EXAMPLE 12

4.75 mg (0.020 mmol) of nickel(II) chloride ($NiCl_2 \cdot 6H_2O$, manufactured and sold by Kanto Chemical Co., Ltd., Japan) and 10 mg (0.90 mmol as monomer units; molar ratio to the nickel atoms: 4.5) of poly-(N-vinyl-2-pyrrolidone) (manufactured and sold by Tokyo Kasei Kogyo Co., Ltd., Japan; number average molecular weight: 10,000) are dissolved in 18.5 ml of ethanol in an atmosphere of hydrogen, the ethanol having been degassed to remove any dissolved oxygen. 2.27 mg (0.060 mmol) of sodium tetrahydroborate dissolved in 1.5 ml of ethanol is dropwise added to the above-obtained solution in an atmosphere of nitrogen while stirring, thereby obtaining a blackish brown, uniform colloidal dispersion of nickel boride particles.

1 g of silica gel (Kieselgel 60; 70–230 meshes, Merck & Co., Inc., Germany) is placed in a 50 mleggplant type flask and the air in the flask is replaced with hydrogen. 20 ml of the nickel boride particle dispersion is added to the silica gel and the resultant mixture is stirred at 30° C. for 24 hours in an atmosphere of hydrogen under atmospheric pressure, thereby adsorbing the nickel boride particles onto the silica gel. After the mixture is allowed to stand still for 24 hours, the resultant reddish brown nickel boride particle-silica gel composite is separated from a colorless supernatant.

The measurement of the amount of the nickel boride particles in the particle-bearing composite is performed in the same manner as described in Example 1 except that no centrifugation is carried out. That is, the measurement is conducted using a calibration curve prepared by utilizing the difference between the absorbances at 500 nm and 700 nm. Thus, it is found that the above nickel boride particle-silica gel composite bears nickel boride particles in an amount of $185.0 \times 10^{-7}$ mol (in terms of nickel atoms) per gram of the silica gel.

When 0.5 ml of an ethanol solution containing 0 25 mmol 1-hexene is dropwise added thereto, the hydrogen begins to be absorbed, thereby forming hexane. In this instance, the initial rate of hydrogenation is found to be 0.19 mol/sec per gram atom of nickel. This rate is 12 times the rate attained by the use of a commercially available Raney nickel catalyst.

EXAMPLE 13

39 mg (0.156 mmol) of copper sulfate ($CuSO_4 \cdot 5H_2O$, manufactured and sold by Kanto Chemical Co., Ltd., Japan) and 17.4 mg (0.156 mmol as monomer units; molar ratio to the copper atoms: 1) of poly(N-vinyl-2-pyrrolidone) (manufactured and sold by Tokyo Kasei Kogyo Co., Japan; number average molecular weight: 10,000) are dissolved in 25 ml of water. To the resultant solution is added 38.7 mg (0.156 mmol) of sodium thiosulfate ($Na_2S_2O_3 \cdot 5H_2O$, manufactured and sold by Kanto Chemical Co., Ltd., Japan) dissolved in 25 ml of water. While stirring, the resultant solution is heated at 60° C. for 30 minutes, thereby obtaining a reddish brown, uniform colloidal dispersion of copper sulfide particles.

3 ml of the above-obtained copper sulfide particle dispersion is added to 1 g of silica gel (Kieselgel 60, 70–230 meshes, manufactured and sold by Merck & Co., Inc., Germany) and the resultant mixture is subjected to shaking for 24 hours, thereby adsorbing the copper sulfide particles onto the silica gel.

The measurement of the amount of the copper sulfide particles in the particle-bearing composite is performed in substantially the same manner as described in Example 1 except that no centrifugation is carried out and that a calibration curve is prepared utilizing the difference between the absorbance values measured at 400 nm and 500 nm. As a result, it is found that the above copper sulfide particle-silica gel composite bears copper sulfide particles in an amount of $72.3 \times 10^{-7}$ mol(as copper atoms) per gram of the silica gel.

EXAMPLE 14

5.9 mg (0.033 mmol) of palladium (II) chloride (PdC12, manufactured and sold by Kojima Chemical Co., Japan) and 0.95 mg (0.0086 mmol as monomer units; molar ratio to the palladium atoms: 0.26) of poly(N-vinyl-2pyrrolidone) (manufactured and sold by Tokyo Kasei Kogyo Co., Japan; number average molecular weight: 10,000) are dissolved in 25 ml of methanol and 25 ml of distilled water, respectively. The thus-obtained two solutions are mixed with each other to thereby obtain a yellow solution. This solution is heated under reflux for 4 hours in a 100 ml-flask provided with a reflux condenser, thereby obtaining a blackish brown, uniform colloidal dispersion of metallic palladium particles An aliquot of the palladium particle dispersion is dried on a carbon film to prepare a test solid sample, and the test solid sample is observed through a transmission type electron microscope. As a result, it is found that the dispersion of the metallic palladium particles is good and that the average particle diameter of the palladium particles is 36 Å, wherein the coefficient of variation is 51%. The palladium particle dispersion is stable and exhibits no change in the dispersion state even after storage for more than a week at room temperature.

Then, a polystyrene resin (Bio-Beads SM-2, styrene-divinylbenzene copolymer, 20–50 meshes, manufactured and sold by Bio-Rad Laboratories) is washed with water and methanol and dried at 30° C. under vacuum.

The pH value of the above-obtained palladium particle dispersion is adjusted to 4 with a small quantity of sodium hydroxide solution. To 10 ml of the pH-adjusted dispersion is added 0.5 g of the polystyrene resin, and the resultant mixture is subjected to shaking for 24 hours in an atmosphere of nitrogen gas, thereby adsorbing the palladium particles onto the polystyrene resin.

The amount of the palladium particles in the particle-bearing composite is measured in the same manner as described in Example 4. As a result, it is found that the above palladium particle-polystyrene resin composite bears palladium particles in an amount of $160 \times 10^{-7}$ mol(as palladium atoms) per gram of the polystyrene resin.

The hydrogenation of acrylonitrile is carried out using the palladium particle-polystyrene resin composite as a catalyst in substantially the same manner as described in Example 1. The initial rate of hydrogenation is found to be 0.23 mol/sec per gram atom of palladium.

EXAMPLE 15

In the dark, 5.61 mg (0.033 mmol) of silver nitrate ($AgNO_3$, manufactured and sold by Kanto Chemical Co., Ltd., Japan) and 3.96 mg (0.036 mmol as monomer units; molar ratio to the silver atoms: 1.09) of poly(N-vinyl-2-pyrrolidone) (manufactured and sold by Tokyo Kasei Co., Japan; number average molecular weight: 10,000) are dissolved in 30 ml and 15 ml of methanol, respectively. The thus obtained two solutions are mixed with each other to thereby obtain a colorless solution. In the dark, this solution is heated under reflux for 30 minutes in a 100 ml-flask provided with a reflux condenser. After that, 1.32 mg of sodium hydroxide dissolved in 5 ml of methanol is added to the heated solution. Then the resultant solution is further heated in the dark for 10 minutes to thereby obtain a yellow, uniform colloidal dispersion of metallic silver particles.

An aliquot of the silver particle dispersion is dried on a carbon film to prepare a test solid sample, and the test solid sample is observed through a transmission type electron microscope. As a result, it is found that the dispersion of the metallic silver particles is good and that the average particle diameter of the silver particles is 68 Å, wherein the coefficient of variation is 43%.

The silver particle dispersion is stable in the dark and exhibits no change in the dispersion state even after storage for more than 3 weeks at room temperature.

A polystyrene resin is pretreated in the same manner as described in Example 14 and then the resin is kept in an atmosphere of hydrogen gas for 24 hours.

10 ml of the above-obtained silver particle dispersion is added to 0.5 g of the polystyrene resin and the resultant mixture is subjected to shaking for 24 hours in an atmosphere of hydrogen gas, thereby adsorbing the silver particles onto the polystyrene resin.

The amount of the silver particle in the particle-bearing composite is measured in substantially the same manner as described in Example 14 except that a calibration curve is prepared utilizing the absorbance at 400 nm which is measured by taking as a base line a tangential line drawn at the lowest portions of both sides of the characteristic absorption band (320 nm–630 nm) of the colloidal dispersion of metallic silver particles in the ultraviolet-visible absorption spectrum. As a result, it is found that the above silver particle-polystyrene resin composite bears silver particles in an amount of $81.0 \times 10^{-7}$ mol(as silver atoms) per gram of the polystyrene resin.

EXAMPLE 16

The same silver particle dispersion as described in Example 15 is used, and the same silica gel as described in Example 4 is used. 20 ml of the silver particle dispersion is added to 0.081 g of silica gel and the resultant mixture is subjected to shaking for 24 hours in an atmosphere of nitrogen gas, thereby adsorbing the silver particles onto the silica gel.

The amount of the silver particles in the particle-bearing composite is measured in the same manner as described in Example 15. As a result, it is found that the above silver particle-silica gel composite bears silver particles in an amount of $747 \times 10^{-7}$ mol(as silver atoms) per gram of the silica gel.

EXAMPLE 17

The same silver particle dispersion as described in Example 15 is used, and Daiso Gel SP-2103 (manufactured and sold by Daiso Co., Ltd., average particle diameter: 5 $\mu$m) is used as silica gel. 70 ml of the silver particle dispersion is added to 0.095 g of the silica gel and the resultant mixture is subjected to shaking for 48 hours in an atmosphere of nitrogen gas, thereby adsorbing the silver particles onto the silica gel.

The amount of the silver particles in the particle-bearing composite is measured in the same manner as described in Example 15. As a result, it is found that the above silver particle-silica gel composite bears silver particles in an amount of $3950 \times 10^{-7}$ mol(as silver atoms) per gram of the silica gel.

COMPARATIVE EXAMPLE 1

Using 5.9 mg (0.033 mmol) of palladium (II) chloride ($PdCL_2$, manufactured and sold by Kojima Chemical Co., Ltd., Japan) and 150 mg (1.36 mmol as monomer units; molar ratio to the palladium atoms: 41) of poly(N-vinyl-2-pyrrolidone)(manufactured and sold by Tokyo Kasei Kogyo Co., Ltd., Japan; number average molecular weight: 360,000), a metallic palladium particle dispersion is prepared in the same manner as described in Example 1, thereby obtaining a blackish brown, uniform colloidal dispersion of metallic palladium particles.

10 ml of the above-obtained palladium particle dispersion is added to 5 g of activated carbon (BAC G-70R, average particle diameter: 0.7 mm, manufactured and sold by Kureha Chemical Industry Co., Ltd., Japan) and the resultant mixture is subjected to shaking for 24 hours, thereby adsorbing the palladium particles onto the activated carbon.

It is found that the above palladium particle-activated carbon composite bears palladium particles in an amount of $0.1 \times 10^{-7}$ mol per gram of the activated carbon. This amount of the palladium particle in the particle-bearing composite is only 0.1% of the amount ($102.5 \times 10^{-7}$ mol) attained by Example 2.

COMPARATIVE EXAMPLE 2

Using 5.9 mg (0.033 mmol) of palladium(II) chloride (PdCl2, manufactured and sold by Kojima Chemical Co., Ltd., Japan) and 150 mg (1.36 mmol as monomer units; molar ratio to the palladium atoms: 41) of poly(N-vinyl-2-pyrrolidone)(manufactured and sold by Tokyo Kasei Kogyo Co., Ltd., Japan; number average molecular weight: 360,000), substantially the same procedure as in Example 2 is repeated, thereby obtaining a blackish brown, uniform colloidal dispersion of metallic palladium particles.

5 ml of the above-obtained palladium particle dispersion is added to 0.5 g of silica gel (Kieselgel 60; 70–230 meshes, manufactured and sold by Merck & Co., Inc., Germany) and the resultant mixture is subjected to shaking for 24 hours.

The amount of any palladium particles carried by the silica gel is measured in the same manner as described in Example 4. As a result, it is found that no metallic palladium particle is adsorbed onto the silica gel so that no palladium particle-silica gel composite can be obtained.

COMPARATIVE EXAMPLE 3

A palladium catalyst comprised of palladium carried by activated carbon is prepared by the conventional impregnation method according to R. Monzingo, Organic Syntheses, Collective Volume III, pages 685–690, 1955. Illustratively stated, to an activated carbon (BAC G-70R, average particle diameter: 0.7 mm, manufactured and sold by Kureha Chemical Industry Co., Ltd., Japan) is added 10% nitric acid, and the resultant mixture is heated in a water bath for 2 hours. The acid-treated activated carbon is filtered, washed with water and then, dried. 1.2 Liters of water is added to 93 g of the thus obtained dried activated carbon and the resultant mixture is heated to 80° C., and to this mixture is added a solution of 8.2 g of palladium(II) chloride and 20 ml of concentrated hydrochloric acid in 50 ml of water. To the resultant mixture is added 8 ml of 37% aqueous formaldehyde solution, and then the reaction mixture is rendered weakly alkaline by the addition of 30% sodium hydroxide, thereby causing the palladium(II) chloride to be reduced to form metallic palladium particles. The resultant palladium particles-bearing activated carbon is subjected to filtration, washing with water and drying, thereby obtaining a palladium catalyst comprised of 5% palladium particles-activated carbon composite.

Using 0.043 g of the palladium catalyst comprised of 5% palladium particles and activated carbon (palladium content: $2 \times 10^{-5}$ gram atom), acrylonitrile is hydrogenated in substantially the same manner as described in Example 1, thereby obtaining propionitrile. The initial rate of hydrogenation is found to be 0.028 mol/sec per gram atom of palladium.

EXAMPLE 18

In the dark, 112.2 mg (0.66 mmol) of silver nitrate (AgNO3, manufactured and sold by Kanto Chemical Co., Ltd., Japan) and 74 mg (0.67 mmol as monomer units; molar ratio to the silver atoms: 1) of poly(N-vinyl-2-pyrrolidone) (manufactured and sold by Tokyo Kasei Kogyo Co., Ltd., Japan; number average molecular weight: 10,000) are dissolved in 500 ml of methanol and 400 ml of methanol, respectively. The thus obtained two solutions are mixed with each other to thereby obtain a colorless transparent solution. This solution is heated in the dark under reflux for 30 minutes in a 1000 ml-eggplant type two-neck flask provided with a reflux condenser. Then, thereto is added 100 ml of a methanol solution containing 26.4 mg (0.66 mmol) of sodium hydroxide and heated under reflux for 10 minutes, thereby preparing a yellow, uniform colloidal dispersion of metallic silver particles.

1000 ml of the above-obtained metallic silver particle dispersion is added to 5 g of silica gel (Daiso Gel SP-2103, manufactured and sold by Daiso Co., Ltd., Japan, average particle diameter: 5 $\mu$m) and the resultant mixture is subjected to shaking for 24 hours in an atmosphere of nitrogen gas, thereby adsorbing the silver particles onto the silica gel. The amount of the silver particles in the particle-bearing composite is measured in the same manner as described in Example 15, in which the ultraviolet-visible absorption spectrum of the supernatant is measured and the absorbance at 400 nm is used for determining the amount of the silver particles.

Next, the supernatant of the resultant mixture is removed by decantation, 1000 ml of fresh one of the same uniform colloidal dispersion of metallic silver particles as described above is added to the residual metallic silver particle-silica gel composite. Then, the resultant mixture is subjected to shaking for 48 hours in an atmosphere of nitrogen gas, thereby adsorbing the silver particles onto the silica gel. The amount of silver particles in the particle-bearing composite is measured in the same manner as described above.

Further, the supernatant of the resultant mixture is removed by decantation, and 1000 ml of fresh one of the same dispersion of metallic silver particles as mentioned above is again added to the residual metallic silver particle-silica gel composite and the resultant mixture is subjected to shaking for 72 hours in an atmosphere of nitrogen gas, thereby adsorbing the silver particles onto the silica gel. The amount of silver particles in the particle-bearing composite is measured in the same manner as described above. As a result, it is found that the amount of the silver particles adsorbed on the silver particle-silica gel composite has reached a level as high as $19,800 \times 10^{-7}$ mol per 5 g of the silica gel. This means that the thus obtained silver particle-silica gel composite bears silver particles in an amount of $3,960 \times 10^{-7}$ mol per gram of the silica gel.

After removing the supernatant from the above mixture by decantation, the thus obtained silver particle-silica gel composite is washed with methanol 5 times. As a result, it is observed that the amount of silver particles which have been washed out in the methanol used for washing is only $2.56 \times 10^{-8}$ mol of per gram of the silica gel. This shows that almost no washing-off of the silver, particles from the silica gel has occured.

EXAMPLE 19

In the dark, 56.1 mg (0.33 mmol) of silver nitrate (AgNO3, manufactured and sold by Kanto Chemical Co., Ltd., Japan) and 36.9 mg (0.34 mmol as monomer units; molar ratio to the silver atoms: 1.03) of poly(N-vinyl-2-pyrrolidone) (manufactured and sold by Tokyo Kasei Kogyo Co., Ltd., Japan; number average molecular weight: 10,000) are dissolved in 250 ml of methanol and 200 ml of methanol, respectively. The resultant two solutions are mixed together to thereby obtain a colorless transparent solution. This solution is heated under reflux for 30 minutes in the darkness in a 1000 ml-eggplant type two-neck flask provided with a reflux condenser. Then, 50 ml of methanol containing 13.2 mg (0.33 mmol) of sodium hydroxide is added and heated under reflux for 10 minutes, thereby preparing a yellow, uniform colloidal dispersion of metallic silver particles.

On the other hand, polystyrene resin (Shodex Polymer-HP-125, styrene-divinylbenzene copolymer, average particle diameter: 10 μm, manufactured and sold by Showa Denko K. K., Japan) is washed with distilled water and methanol, and then stored in an atmosphere of hydrogen gas for 24 hours.

In the dark, 500 ml of the above-obtained silver particle dispersion is added to 5.0 g of the thus obtained polystyrene resin, and the resultant mixture is subjected to shaking for 24 hours in an atmosphere of hydrogen gas, thereby adsorbing the silver particles onto the polystyrene resin. The amount of the silver particles in the particle-bearing composite is measured in the same manner as described in Example 15, in which the ultraviolet-visible absorption spectrum of the supernatant is measured and the absorbance at 400 nm is used for determining the amount of the silver particles.

Subsequently, the supernatant of the mixture is removed by decantation, and 500 ml of fresh one of the same uniform colloidal dispersion of metallic silver particles as described above is added to the residual silver particle-polystyrene composite. Then, the resultant mixture is stored in an atmosphere of hydrogen gas for 24 hours, thereby adsorbing the silver particles onto the composite. The amount of silver particles in the particle-bearing composite is measured in the same manner as described above.

Furthermore, the supernatant of the mixture is removed by decantation, and again 500 ml of fresh one of the same dispersion of metallic silver particles as mentioned above is added to the residual silver particle-polystyrene composite. In the dark, the resultant mixture is subjected to shaking for 48 hours in an atmosphere of hydrogen gas, thereby adsorbing the silver particles onto the composite. The amount of silver particles in the particle-bearing composite is measured in the same manner as described above. As a result, it is found that the amount of silver particles adsorbed on the silver particle-polystyrene composite has reached a level as high as $13,200 \times 10^{-7}$ mol (as silver atoms) per 5 g of the polystyrene. This means that the composite bears $2,640 \times 10^{-7}$ mol (as silver atoms) of silver particles per gram of the polystyrene resin. The thus obtained composite is washed with methanol. The washing causes substantially no washing-off of silver particles from the polystyrene resin.

What is claimed is:

1. A particle-bearing composite comprising:
   a solid carrier,
   particles of at least one member selected from the group consisting of a metal and a metal compound, said particles being adsorbed on said carrier, and,
   an organic protective polymer having a number average molecular weight of from 3,000 to 300,000,
   said particles having said protective polymer adsorbed thereon and being substantially individually and separately protected by said protective polymer,
   and wherein at least one of said solid carrier and said protective polymer has no functional group capable of serving to form a covalent bond and perform a chemical binding between said solid carrier and said protective polymer.

2. The composite according to claim 1, wherein said polymer is present in an amount of from 0.01 to 30 in terms of a molar ratio of monomer units constituting said polymer to metal atoms of said particles.

3. The composite according to claim 1, wherein said particles are adsorbed on said carrier in an amount of at least $1 \times 10^{-7}$ moles per gram of said carrier.

4. A method for producing a particle-bearing composite, which comprises:
   (1) providing a polymer-protected colloidal dispersion comprising:
      (a) a dispersion medium,
      (b) colloidal particles of at least one member selected from the group consisting of a metal and a metal compound, said colloidal particles being dispersed in said dispersion medium, and
      (c) an organic protective polymer having a number average molecular weight of from 3,000 to 300,000.
      said collidal particles having said protective polymer adsorbed thereon and being individually and separately protected by said protective polymer serving as a protective colloid;
   (2) contacting said polymer-protected colloidal dispersion with a solid carrier at a temperature of from 0° to 100° C., wherein at least one of said solid carrier and said protective polymer has no functional group capable of serving to form a covalent bond and perform a chemical binding between said solid carrier and said protective polymer, to thereby form a particle-bearing composite comprising said solid carrier and, adsorbed thereon, said particles protected by said protective polymer; and
   (3) isolating said composite from said dispersion medium.

5. The method according to claim 4, wherein said protective polymer of said colloidal dispersion is present in an amount of from 0.01 to 30 in terms of a molar ratio of monomer units constituting said protective polymer to metal atoms of said particles.

6. The composite according to claim 1, wherein said metal is at least one member selected from the group consisting of palladium, rhodium, ruthenium, platinum, iridium, osmium, silver, gold and copper.

7. The composite according to claim 1, wherein said metal compound is at least one of borides, sulfides, hydroxides or oxides of a metal selected from the group consisting of iron, nickel, cobalt, cadmium, copper, barium and aluminum.

8. The method according to claim 4, wherein said metal is at least one member selected from the group consisting of palladium, rhodium, ruthenium, platinum, iridium, osmium, silver, gold and copper.

9. The method according to claim 4, wherein said metal compound is at least one of borides, sulfides, hydroxides or oxides of a metal selected from the group consisting of iron, nickel, cobalt, cadmium, copper, barium and aluminum.

10. The composite according to claim 1, wherein said organic protective polymer is selected from the group consisting of poly(N-vinyl-2-pyrrolidone), poly(vinyl alcohol), copolymer of N-vinyl-2-pyrrolidone with acrylamide or methyl acrylate, poly(methyl vinyl ether), gelatin, sodium casein and gum arabic.

11. The method according to claim 4, wherein said organic protective polymer is selected from the group consisting of poly(N-vinyl-2-pyrrolidone), poly(vinyl alcohol), copolymer of N-vinyl-2-pyrrolidone with acrylamide or methyl acrylate, poly(methyl vinyl ether), gelatin, sodium casein and gum arabic.

12. The composite according to claim 1, wherein said organic protective polymer has a number average molecular weight of from 10,000 to 160,000.

13. The method according to claim 4, wherein said organic protective polymer has a number average molecular weight of from 10,000 to 160,000.

14. The composite according to claim 1, wherein said solid carrier is selected from the group consisting of activated carbon, silica gel, alumina, silica-alumina, silicon carbide, zirconium silicate, polystyrene or derivaties thereof, diatomaceous earth and pumice.

15. The method according to claim 4, wherein said solid carrier is selected from the group consisting of activated carbon, silica gel, alumina, silica-alumina, silicon carbide, zirconium silicate, polystyrene or derivatives thereof, diatomaceous earth and pumice.

16. The composite according to claim 1, wherein the particle size of said metal and metal compound is from about 10Å to 0.3 μm.

17. The method according to claim 4, wherein the particle size of said metal and metal compound is from about 10Å to 0.3 μm.

18. The composite according to claim 1, wherein the average particle size is from about 40 Å to 2.0 μm.

19. The method according to claim 4, wherein the average particle size is from about 40Å to 2.0 μm.

20. The method according to claim 4, wherein said dispersion medium is selected from the group consisting of water, a straight chain or branched chain alcohol having 1 to 10 carbon atoms, a water miscible ether and a mixture thereof.

* * * * *